US011583865B2

(12) United States Patent
Saxena et al.

(10) Patent No.: US 11,583,865 B2
(45) Date of Patent: Feb. 21, 2023

(54) LINER ASSEMBLY AND SYSTEM FOR ORE GRINDING MILL

(71) Applicant: COMPAÑÍA ELECTRO METALÚRGICA S.A., Santiago (CL)

(72) Inventors: Amit Saxena, Maple Grove, MN (US); Jason S. Melville, Phoenix, AZ (US); Ariel Medina, Vitacura (CL)

(73) Assignee: COMPAÑÍA ELECTRO METALÚRGICA S.A., Santiago (CL)

( * ) Notice: Subject to any disclaimer, the term of this patent is extended or adjusted under 35 U.S.C. 154(b) by 427 days.

(21) Appl. No.: 16/719,400

(22) Filed: Dec. 18, 2019

(65) Prior Publication Data
US 2020/0122156 A1 Apr. 23, 2020

Related U.S. Application Data

(63) Continuation of application No. 16/443,388, filed on Jun. 17, 2019.
(Continued)

(51) Int. Cl.
*B02C 17/18* (2006.01)
*B02C 17/02* (2006.01)
(Continued)

(52) U.S. Cl.
CPC .......... *B02C 17/1805* (2013.01); *B02C 17/02* (2013.01); *B02C 17/22* (2013.01);
(Continued)

(58) Field of Classification Search
CPC ...... G01B 7/06; G01B 17/02; G05B 23/0283; G05B 1/00; B02C 25/00; B02C 17/02;
(Continued)

(56) References Cited

U.S. PATENT DOCUMENTS 7,677,079 B2 *  3/2010  Radziszewski .......... G01N 3/56
                                                      73/7
7,957,944 B2 *  6/2011  Herbst .................... B02C 25/00
                                                      703/7
(Continued)

FOREIGN PATENT DOCUMENTS

AU     2016201314 A1    3/2016
WO     WO199300997 A1   1/1993
WO     2008021040 A1    2/2008

OTHER PUBLICATIONS

International Preliminary Report on Patentability for Application No. PCT/US2019/037470, completed Jun. 18, 2020, 17 pages (includes Amendment under Article 34).
(Continued)

*Primary Examiner* — John H Le
(74) *Attorney, Agent, or Firm* — Merchant & Gould P.C.

(57) ABSTRACT

The present invention provides a system and method for more efficient utilization of comminution mills. Sensors are provided in the liners placed within the mill shell. The sensors may include RFID tags, liner wear profile sensors (e.g., such as an ultrasonic sensor), an inertial sensor (preferably included both an inclinometer and an accelerometer, and an acoustic sensor, among others. When the liners are installed in the shell, the RFID tag is used to register the location of the liner within the shell. In operation, the information provided by the sensors is collected by a data transmission unit and sent by transmitter over the air to a computer having an antenna and receiver for such data. The data is correlated and a processor generates data for display in regions on a display device.

25 Claims, 11 Drawing Sheets

Related U.S. Application Data

(60) Provisional application No. 62/686,649, filed on Jun. 18, 2018.

(51) Int. Cl.
| | |
|---|---|
| *B02C 17/22* | (2006.01) |
| *B02C 25/00* | (2006.01) |
| *G05B 1/00* | (2006.01) |
| *G01B 7/06* | (2006.01) |
| *G01B 17/02* | (2006.01) |
| *G01N 29/07* | (2006.01) |
| *G05B 23/02* | (2006.01) |

(52) U.S. Cl.
CPC ............... *B02C 25/00* (2013.01); *G01B 7/06* (2013.01); *G01B 17/02* (2013.01); *G01N 29/07* (2013.01); *G05B 1/00* (2013.01); *G05B 23/0283* (2013.01); *B02C 2201/00* (2013.01); *B02C 2210/01* (2013.01)

(58) Field of Classification Search
CPC . B02C 17/1805; B02C 17/22; B02C 2201/00; B02C 2210/01; G01N 29/07
USPC .......................................................... 702/34
See application file for complete search history.

(56) References Cited

U.S. PATENT DOCUMENTS

| | | | |
|---|---|---|---|
| 2012/0217357 A1* | 8/2012 | Franke | ................. G01B 11/24 248/163.1 |
| 2015/0362306 A1 | 12/2015 | Steed et al. | |
| 2017/0050769 A1 | 2/2017 | Steed et al. | |
| 2019/0381511 A1 | 12/2019 | Melville et al. | |

OTHER PUBLICATIONS

International Search Report and Written Opinion for Application No. PCT/US2019/037470 dated Sep. 20, 2019, 13 pages.

Final Office Action issued in related U.S. Appl. No. 16/443,388, dated Oct. 22, 2021 (17 pages).

Sensors Automate Grinding, retrieved date Oct. 17, 2021; https://www.mmsonline.com/articles/sensors-automate-grinding-dressing-wheel-positioning—(2 pages).

International Search Report and Written Opinion for Application No. PCT/US2019/067238 dated Apr. 23, 2020.

Acoustic Wave Technology Sensors_ Fierce Electronics, retrieved date Mar. 6, 2022. https://www.fierceelectronics.com/sensors/exodigo-uses-sensors-ai-make-underground-maps.

Process monitor of grinding machine, retrieved date Mar. 6, 2022. file:///C:/Users/malawadi/Desktop/Application/A%2016443388/Process%20Monitor%20of%20gridning%20machine.pdf.

\* cited by examiner

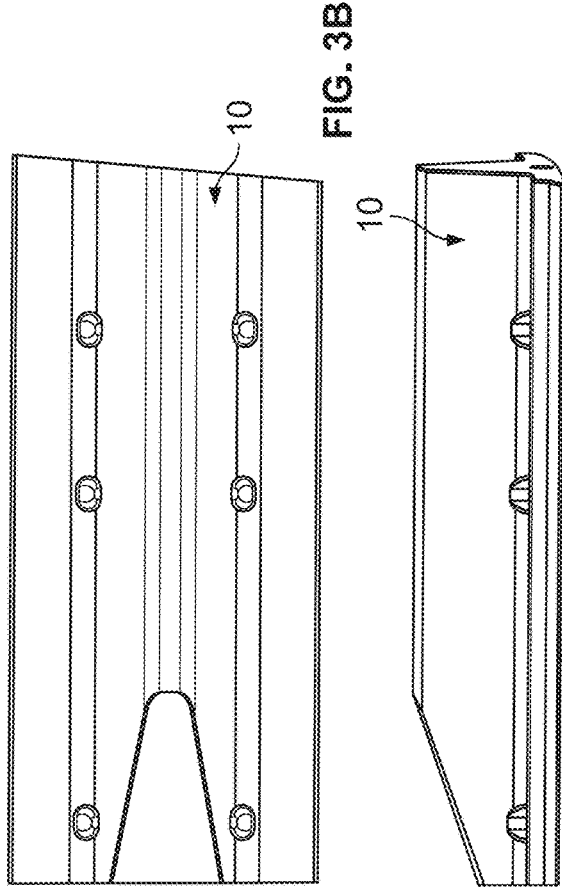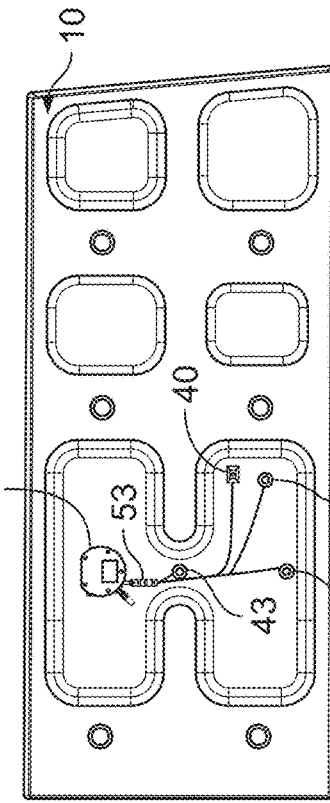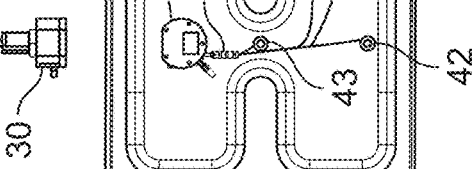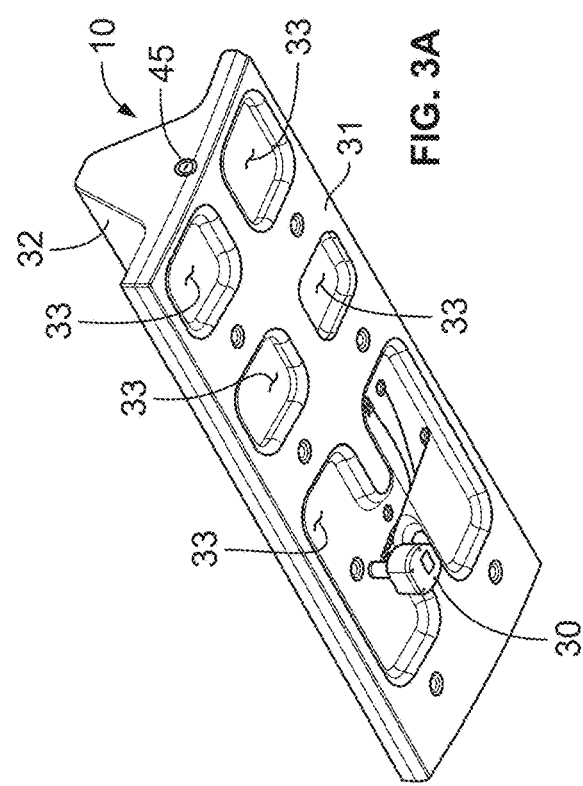

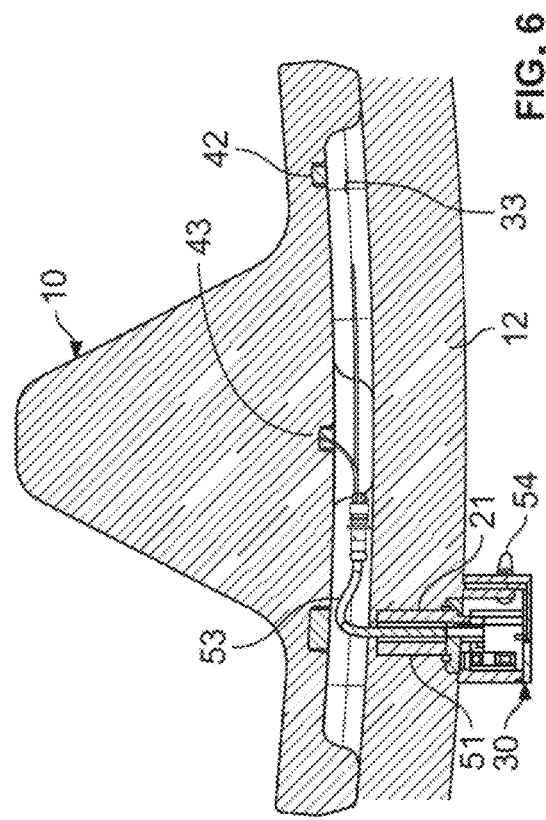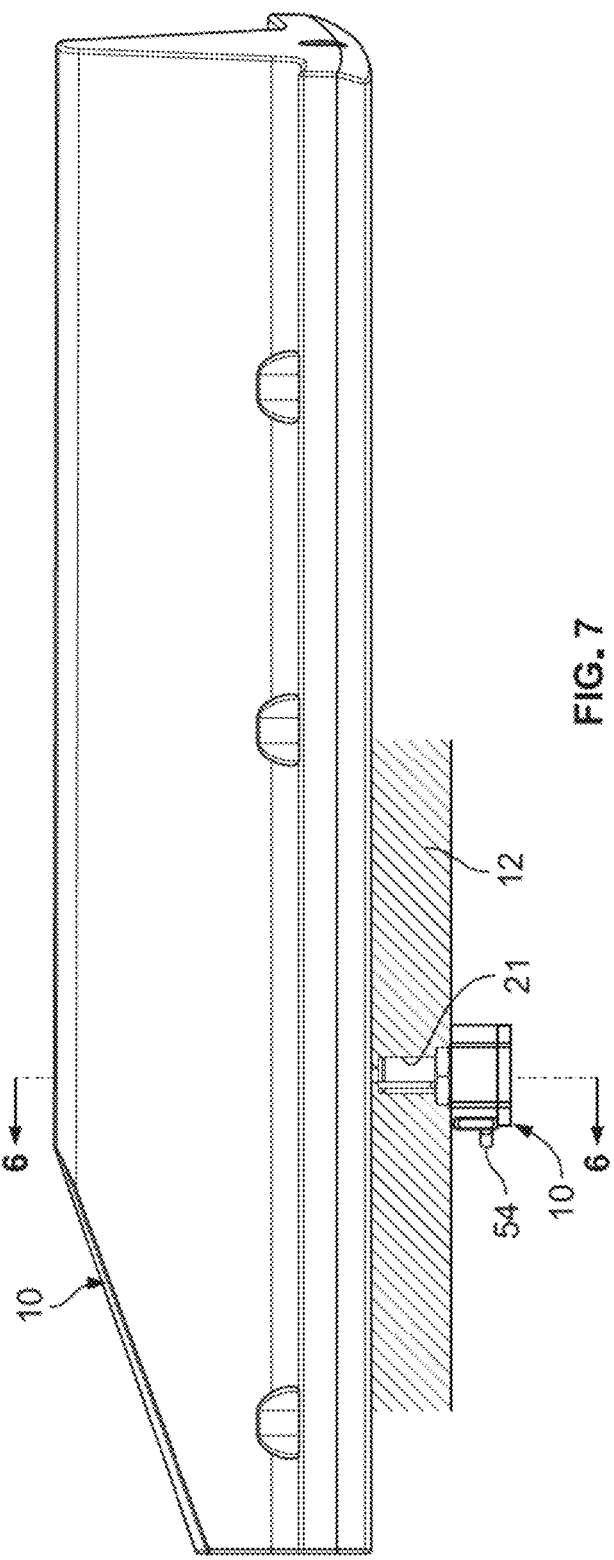

LINER ASSEMBLY AND SYSTEM FOR ORE GRINDING MILL

CROSS-REFERENCE TO RELATED APPLICATION

This application is a continuation-in-part of U.S. patent application Ser. No. 16/443,388, filed on Jun. 17, 2019, which claims the benefit of U.S. Provisional Patent Application Ser. No. 62/686,649, filed on Jun. 18, 2018, the disclosure of which is incorporated herein by reference in its entirety.

FIELD OF THE INVENTION

The present invention relates generally to mining, more particularly to ore grinding and milling machines, and still more particularly to a system and method for more efficient utilization of comminution mills.

BACKGROUND OF THE INVENTION

Comminution mills are large rotating drums for reducing ore to a usable form. Ore, or "media," tumbles within the drum as it rotates, falling upon itself, impacting the inner surfaces of the mill, and impacting mill charge, which often includes loose metal balls or rods inside the mill. This process cuts, crushes, and grinds large ore into small ore, or small ore into fine powder.

The milling process is quite old but works well. Interactions between the media, the charge, and the inner surfaces can quickly reduce ore to a manageable and usable form, depending on the application. Not surprisingly, this process is incredibly destructive on the machinery. As a result, mills are always fit with liners. Were mills not protected with liners, the media and charge would directly impact the shell of the mill, would wear a hole through the shell, and the entire mill would be have to be replaced. The use of liners protects the shell. Accordingly, instead of the mill wearing out, the liners are worn as the mill operates.

Eventually the liners must be replaced. However, downtime of a day or two during re-line can represent potentially tens if not hundreds of thousands of dollars in lost opportunity. Mill operators thus prefer to perform re-lines as infrequently and as quickly as possible. But they must perform repair work every time a liner becomes damaged to the point where it jeopardizes the safety or integrity of the mill. So mill operators sometimes replace liners or perform re-lines too soon. When an entire crew is performing a re-line, it can be more efficient to replace partially worn liners that still have usable life in them than to bring the crew back later and put the mill out of commission a second time. Premature or unnecessary replacement has costs, too, of course.

Therefore, there arises a need in the art for a system and method to monitor liners, schedule re-lines, and improve efficiency of comminution mills.

SUMMARY

The present invention discloses a system and method for more efficient utilization of comminution mills. One or more sensors are provided in the liners placed within the mill shell. The sensors may include RFID tags, liner wear profile sensors (e.g., such as an ultrasonic sensor), an inertial sensor (preferably included both an inclinometer and an accelerometer, and an acoustic sensor, among others. When the liners are installed in the shell the RFID tag is used to register the location of the liner within the shell.

In operation, the information provided by the sensors is collected by a data transmission unit and sent by transmitter over the air to a computer having an antenna and receiver for such data. The computer's CPU takes the data and updates a database using the RFID information to correlate the received information to the respective liner. An operator is able to review the data in real time while the mill is in running to determine the efficiency of the mill and to determine if the any of the liners require replacement. Changes may be made to the operation of the mill based on this information.

Therefore, according to one aspect of the invention, there is provided a liner assembly, of the type utilized as a wear item in the interior of a comminution mill from the media and charge, comprising: a body having a length, width, and depth, the body located within the comminution mill and further having a void formed in a portion of the body; and a sensor located in the void in the body, the sensor arranged and configured to measure a change in the depth of the body.

Further to the above paragraph, additional aspects include (alone or in combination): wherein the sensor is an ultrasonic sensor; further including an acoustic sensor for generating a signal indicative of the number of strikes on the liner assembly from the media and charge during operation of the comminution mill; further including an accelerometer sensor for generating a signal indicative of the intensity of strikes on the liner assembly from the media and charge during operation of the comminution mill; further including an accelerometer sensor for generating a signal indicative of the relative position of the liner assembly within the comminution mill during operation of the comminution mill; and wherein the liner assembly further includes an RFID tag, whereby the location of the liner assembly within the comminution mill may be registered upon installation of the liner assembly within the mill.

According to second aspect of the invention, there is provided a system for monitoring the operation of a comminution mill, comprising: a plurality of liner assemblies, the liner assemblies located within the comminution mill in a known position; a plurality of sensors to monitor a wear parameter of the liner assemblies, wherein each liner assembly includes a corresponding sensor, each sensor is arranged and configured to generate a first signal indicative of a wear parameter of the corresponding liner assembly, and each sensor is located at least partially within the corresponding liner assembly; and a plurality of transmitters, the plurality of transmitters transmitting the first signals for comparison to predetermined wear reference values.

According to yet another aspect of the invention, there is provided a method for determining the timing for replacement of a liner assembly within a comminution mill, comprising: placing a sensor for measuring a wear profile within a liner assembly; registering the position of the liner assembly within the comminution mill, whereby position of the sensor within the comminution mill is also known; and monitoring the output of the sensor to determine an appropriate time to replace the liner assembly based on the wear profile.

According to another aspect of the invention, there is provided a graphical user interface for monitoring a plurality of liner assemblies, of the type utilized as a wear item in the interior of a comminution mill from the media and charge, comprising: sensors located in each of the plurality of liner assemblies within the comminution mill, wherein a first sensor is arranged and configured to measure a change in the depth of each liner assembly and a second sensor is arranged and configured to measure the sounds of media and charge striking each liner assembly; a plurality of RFID tags having a unique identifier, wherein each liner assembly includes a discrete RFID tag, whereby the location of the each liner assembly within the comminution mill is registered; a data transmission unit operatively connected to the first and second sensors and the RFID tags, wherein the first and second sensor data and associated RFID tag identifier is transmitted to a receiver; a processor connected to the receiver, wherein the processor compares the transmitted signals to predetermined wear reference values and generates a graphical display in a first region of the number of charge strikes per minute occurring in the comminution mill and an estimated time until replacement of one or more of the liner assemblies in a second region; and a display screen operatively connected to the processor on which the graphical information is displayed in the first and second regions.

According to another aspect of the invention, there is provided a system for monitoring the operation of a comminution mill, comprising: a plurality of liner assemblies, the liner assemblies located within the comminution mill in a known position; a plurality of sensors to monitor a wear parameter of the liner assemblies, wherein: each liner assembly includes a first and second sensor, the first sensor generates a first signal indicative of a wear parameter of the corresponding liner assembly and a second sensor generates a second signal indicative of a ball-liner strike on the corresponding liner assembly, and each sensor is located inside of the comminution mill; a plurality of transmitters, the plurality of transmitters transmitting the first and second signals for comparison to predetermined wear reference values and to calculate an anticipated liner assembly lifetime remaining for each of the liner assemblies; and a display device on which the compared anticipated liner assembly lifetime remaining is visually displayed.

According to another aspect of the invention, there is provided a method for generating a graphical user interface for monitoring a plurality of liner assemblies, of the type utilized as a wear item in the interior of a comminution mill from the media and charge, comprising: locating sensors in each of the plurality of liner assemblies within the comminution mill, wherein a first sensor is arranged and configured to measure a change in the depth of each liner assembly and a second sensor is arranged and configured to measure the sounds of media and charge striking each liner assembly; registering a plurality of RFID tags having a unique identifier within the comminution mill, wherein each liner assembly includes a discrete RFID tag; transmitting the data from the first and second sensors and the RFID tags; receiving the data and using a processor to compare the transmitted data to predetermined wear reference values and generating a graphical display in a first region of the number of charge strikes per minute occurring in the comminution mill for each liner assembly and estimating an anticipated time for replacement of one or more of the liner assemblies for display in a second region; and displaying the information in the first and second regions on a display screen.

While the invention will be described with respect to preferred embodiment configurations, methods and specifications, it will be understood that the invention is not to be construed as limited in any manner by either such configuration, methods and/or specifications described herein. Further, while the various sensors are described as specific types of sensors herein and are shown in specific locations within the liners, the principles of this invention extend to utilizing sensors located within the drum (i.e., within the shell of the comminution mill). These and other variations of the inventions will become apparent to those skilled in the art upon a more detailed description.

The advantages and features which characterize the inventions are pointed out with particularity in the claims annexed hereto and forming a part hereof. For a better understanding of the inventions, however, reference should be had to the drawings which form a part hereof and to the accompanying descriptive matter, in which there is illustrated and described embodiments of the inventions.

BRIEF DESCRIPTION OF THE DRAWINGS

Referring to the drawings wherein like numerals represent like parts throughout the several views:

FIGS. 3A-3D are bottom perspective, top plan, side elevation, and bottom plan views of a liner assembly, respectively;

FIG. 6 is a section view through a liner assembly installed in the shell of the mill; and FIG. 7 is a side elevation view of a liner assembly installed in the shell of the mill.

DETAILED DESCRIPTION

Figure 1:
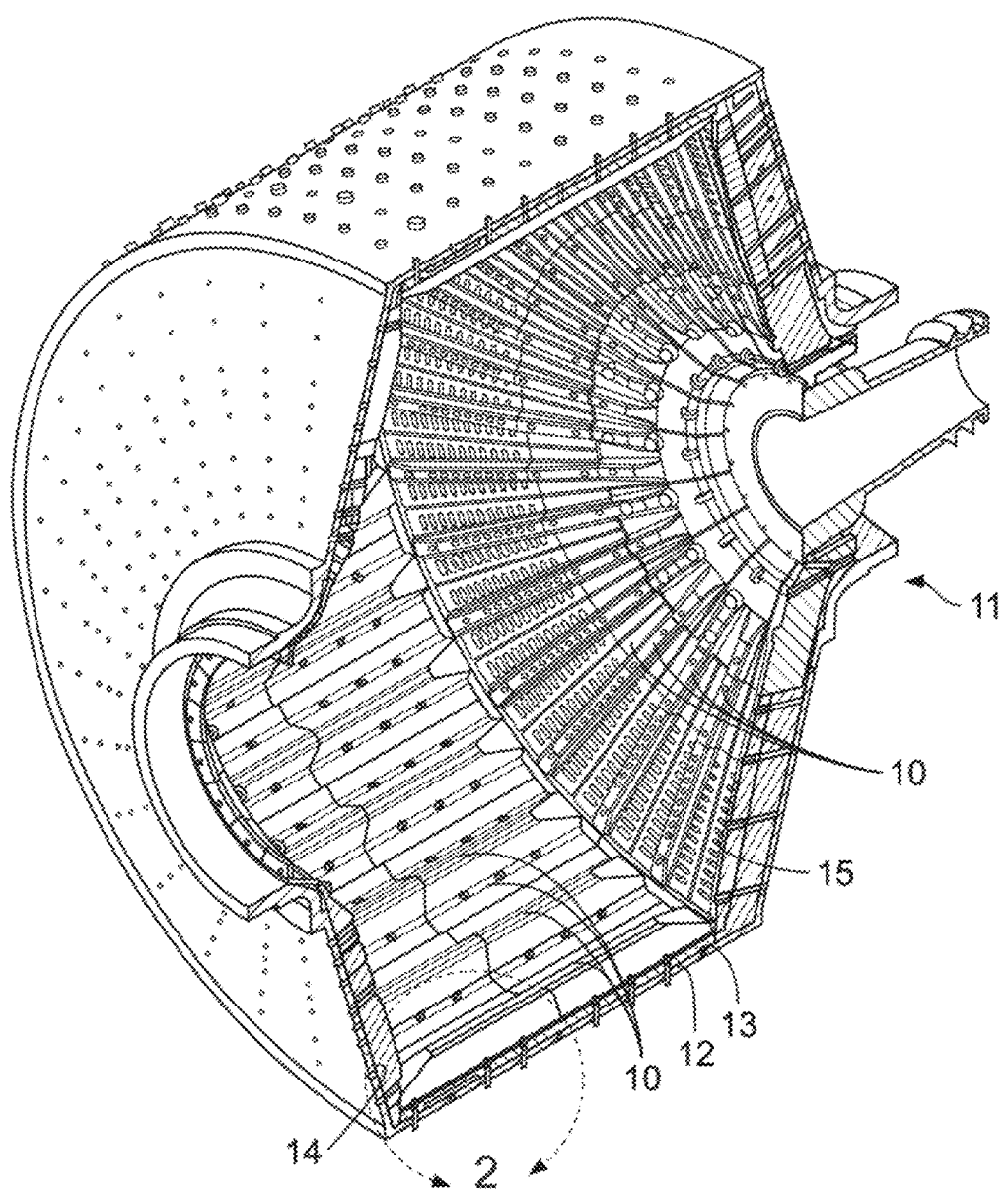
FIG. 1 is a partial section view of a mill outfitted with improved liner assemblies.

Reference now is made to the drawings, in which the same reference characters are used throughout the different figures to designate the same elements. FIG. 1 is a partial section view of an ore grinding mill 11 fitted with a plurality of liner assemblies 10. The liner assemblies 10 protect a shell 12 of the mill 11 during operation of the mill 11, when it is comminuting ore. The liner assemblies 10 are arranged along the inner surface of a cylindrical sidewall 13 of the shell 12 and also on the inner surface of opposed endwalls 14 and 15. The liner assemblies 10 mounted on the sidewall 13 are different in shape and arrangement from the liner assemblies 10 on the endwalls 14 and 15 but have the inventive features and elements described herein. As such, the description herein refers only to the liner assemblies 10 on the cylindrical sidewall 13 with the understanding that it applies equally to the liner assemblies on the endwalls 14 and 15.

Figure 2:
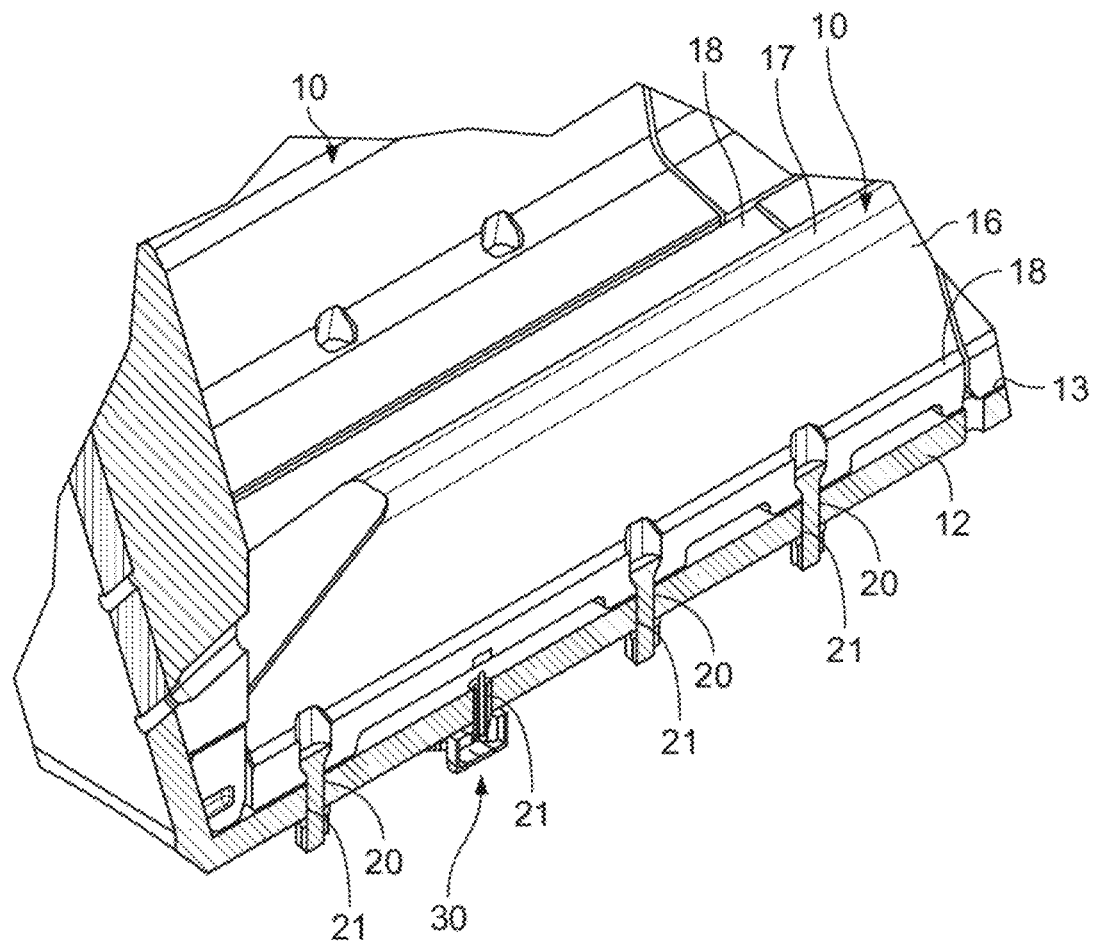
FIG. 2 is an enlarged partial section view showing two liner assemblies installed on the shell of the mill.

FIG. 2 shows in greater detail two liner assemblies 10 mounted to the shell 12. Only one liner assembly 10 will be referred to herein. The liner assembly 10 has a body 16 including a central crown 17 and opposed side flanges 18. The body 16 is elongate, and the crown 17 and flanges 18 extend along the length of the body 16. The crown 17 projects upwardly from the flanges 18 and is a prominent impact site for the ore as it tumbles within the mill 11. The crown 17 has two angled impact surfaces which extend obliquely down to the flanges 18.

The liner assembly 10 is mounted to the shell 12 with a plurality of bolts 20. The bolts 20 are passed through bores 21 in the shell 12 and secured with nuts 22 on the outside of the shell 12, where each nut 22 can be accessed and tightened and loosened on a particular bolt 20. The bolts 20 have enlarged heads which are seated in bores 23 in one of the flanges 18 of the liner assembly 10 to hold the liner assembly 10 tightly and securely to the shell 12. The bores 21 are pre-formed through the shell 12 by the manufacturer of the mill 11, and the bores 23 in the liner assembly 10 are formed to register with those bores 21. However, not all of the bores 21 in the shell 12 correspond to the bores 23 in the liner assembly 10. Instead, at least one bore 21 under each liner assembly 10 is occupied by a data transmission unit ("DTU") 30. The DTU 30 is connected to various data-gathering instruments on the liner assembly 10.

FIG. 3A illustrates the liner assembly 10 from "below," showing the inner surface 31 which is concealed against the shell 12 when mounted thereon, and which is opposite the outer wear surface 32 exposed to the milling charge and ore. Several depressions are formed inward into the liner assembly 10 from the inner surface 31, defining cavities 33 in the liner assembly 10. The data-gathering instruments are preferably mounted in these cavities 33.

As seen in FIG. 3D, within an H-shaped cavity 33 are disposed an inertial sensor 40, an acoustic sensor 41, and two ultrasonic sensors 42 and 43. Each of these sensors 40-43 is coupled in wired data communication with the DTU 30. The sensors 40-43 gather information about the operation of the mill 11, the conditions of the charge and media, and the conditions of the liner assembly 10 itself.

The inertial sensor 40 includes both an accelerometer and an inclinometer. When connected through the DTU 30 to a computer (described in more detail below), the inertial sensor 40 provides information about the movement of the mill 11. The inertial sensor 40 records data about rotational acceleration and velocity of the mill 11. The inclinometer provides information about the angle of the liner assembly 10, from which a computer can determine the position of the liner assembly 10 in the mill 11. In other words, based on the incline of the inertial sensor 40, the computer can determine, for example, if the liner assembly has rotated around to the bottom of the mill 11, is at the top of the mill 11, or is somewhere therebetween. The computer can thus determine the orientation of the crown 17 and the wear surfaces of the crown 17.

The acoustic sensor 41 records information about impacts on the wear surface 32 of the liner assembly 10. The acoustic sensor 41 can measure the number, frequency, and intensity of impacts of charge and media against the liner assembly 10. The intensity of the impacts corresponds to the proportion of charge and media impacting the liner assembly 10, and so the operator can determine how much ore is hitting the liner assembly 10 versus milling charge. Impacts of different proportions of media and charge have different comminution efficiencies, and so knowing the type of impact occurring within the mill 11 is useful in analyzing whether the impacts are effectively reducing the ore. Moreover, the intensity of the impact also corresponds to the context of the impact, namely, whether the mix of media and charge is falling upon itself or is falling upon exposed wear surfaces of the liner assemblies 10. This, too, affects both the efficiency of the comminution and the wear on the liner assemblies 10. By combining this data with that gathered from the inertial sensor 40, a mill operator can determine how the rotational speed of the mill 11 affects the efficiency of the communication and the wear on the liner assemblies 10. The operator can then adjust the speed of the mill 11 to make milling more or less efficient, faster or slower, hotter or cooler, etc.

Figure 4:
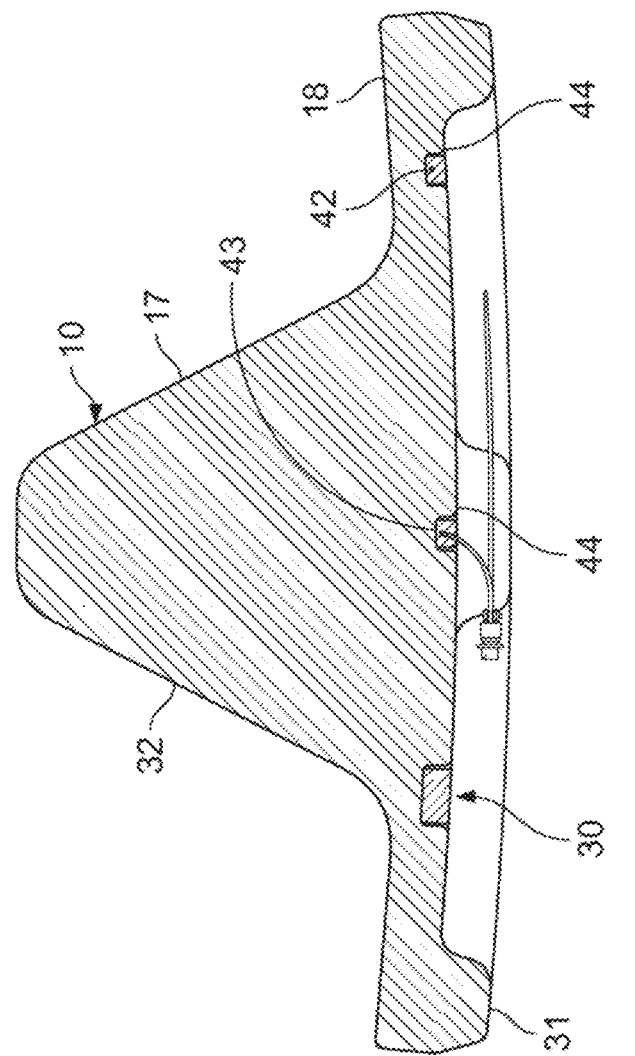
FIG. 4 is a section view through a liner assembly.

The ultrasonic sensors 42 and 43 are shown in FIG. 3D but also in FIG. 4. The sensors 42 and 43 are mounted within small sockets or seats 44 set in from the cavity 33. One ultrasonic sensor 43 is mounted under the crown 17 and the other is mounted under the flange 18. The ultrasonic sensors 42 and 43 transmit ultrasonic waves within the body of the liner assembly 10. The waves bounce within the body and some return to the sensors 42 and 43 where they are received. The sensors 42 and 43 collect this data and transmit it to the DTU 30. A computer connected to the DTU 30 can interpret the data to determine whether and how far the wear surface 32 of the liner assembly 10 is worn or damaged. When a threshold level of wear is detected, the mill operator instructs the liner assembly 10 to be replaced.

When replacement is necessary, the mill operator can easily identify the liner assembly 10. As seen in FIG. 3A, the liner assembly 10 includes an RFID tag 45. The RFID tag 45 is attached to the end of the liner assembly 10 and is coupled in wireless data transmission to the DTU 30. The RFID tag 45 is programmed with identification information when the body 16 of the liner assembly 10 is molded and is affixed to the body 16 just after the body 16 is heat treated. The RFID tag 45 thus is used for identification of the liner assembly 10 not just during the operating life of the liner assembly 10, but before and after as well. The foundry which creates the body 16 of the liner assembly 10 tracks its movement through the foundry grounds with the RFID tag 45, tracks application of the DTU 30 and the sensors 40-43 to the body 16, and tracks the liner assembly 10 through shipping and delivery. When the liner assembly 10 is applied to the mill 11 during initial construction or a re-line, the date and time of installation are recorded and associated with the RFID tag 45, so that the precise operating life of the liner assembly 10 is known. In this way, automatic and electronic records can be maintained for each liner assembly 10 throughout its lifecycle. When the liner assembly 10 needs to be removed, it can be quickly located with the RFID tag 45.

Figure 5:
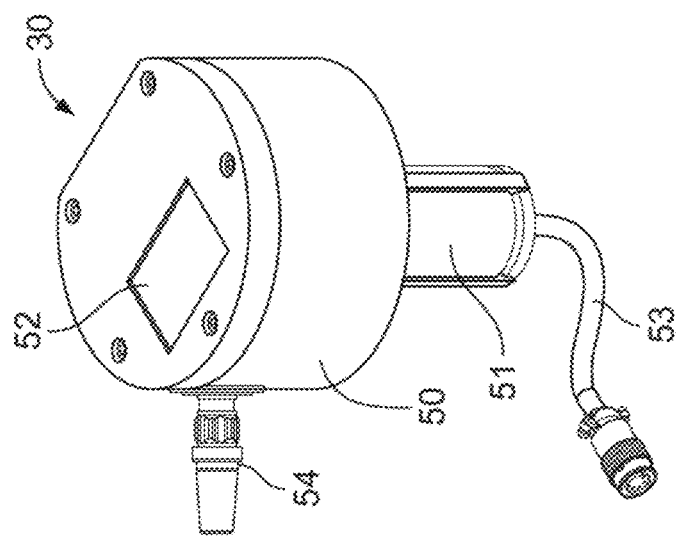
FIG. 5 is a top perspective view of a data transmission unit for use in the liner assembly.

The DTU 30 on each liner assembly 10 provides the communication between the sensors 40-43, the RFID tag 45, and the mill operator's computer. FIG. 5 shows the DTU 30 in detail. The DTU 30 includes a rugged housing 50 with a narrowed post 51. The housing 50 contains a stored power source such as a battery and a programmable controller coupled to an LCD display 52 carried on a head end of the DTU 30 for displaying information relating to the DTU 30 and to the sensors 40-43. The controller within the housing 50 is coupled to the sensors 40-43 with a connector cable 53 extending from the end of the post 51. As seen in FIG. 6, the cable 53 runs through the cavity 33 from the post 51 to the sensors 40-43. The second view of FIG. 6 shows the cable 53 connecting only the ultrasonic sensor 43, but FIG. 3D shows the cable 53 connected to all the sensors 40-43. Thus, there is a physical, wired connection between the DTU 30 and the sensors 40-43, whereas there is a wireless connection between the DTU 30 and the RFID tag 45.

FIGS. 6 and 7 also show how the DTU 30 is mounted in the shell 12. Rather than being buried in the liner assembly 10, the DTU 30 is set into a bore 21. The post 51 is snug fit into the bore 21 and is secured with fasteners or bolts into the shell 12. To prevent the possibility of slurry leakage through the bore 21, a gasket is compressed between the bore 21 and the DTU 30. The length of the post 51 is approximately equal to the thickness of the shell 12, and the post 51 extends through the shell 12 in the bore 21 to the cavity 33. This arranges the head end of the DTU 30 outside the shell 12, so that the display 52 can be observed. The head end further has an antenna 54. The antenna 54 couples the DTU 30 to a wireless data network, so that the mill operator's computer can connect with the DTU 30, the sensors 40-43, and the RFID tag 45.

Figure 8:
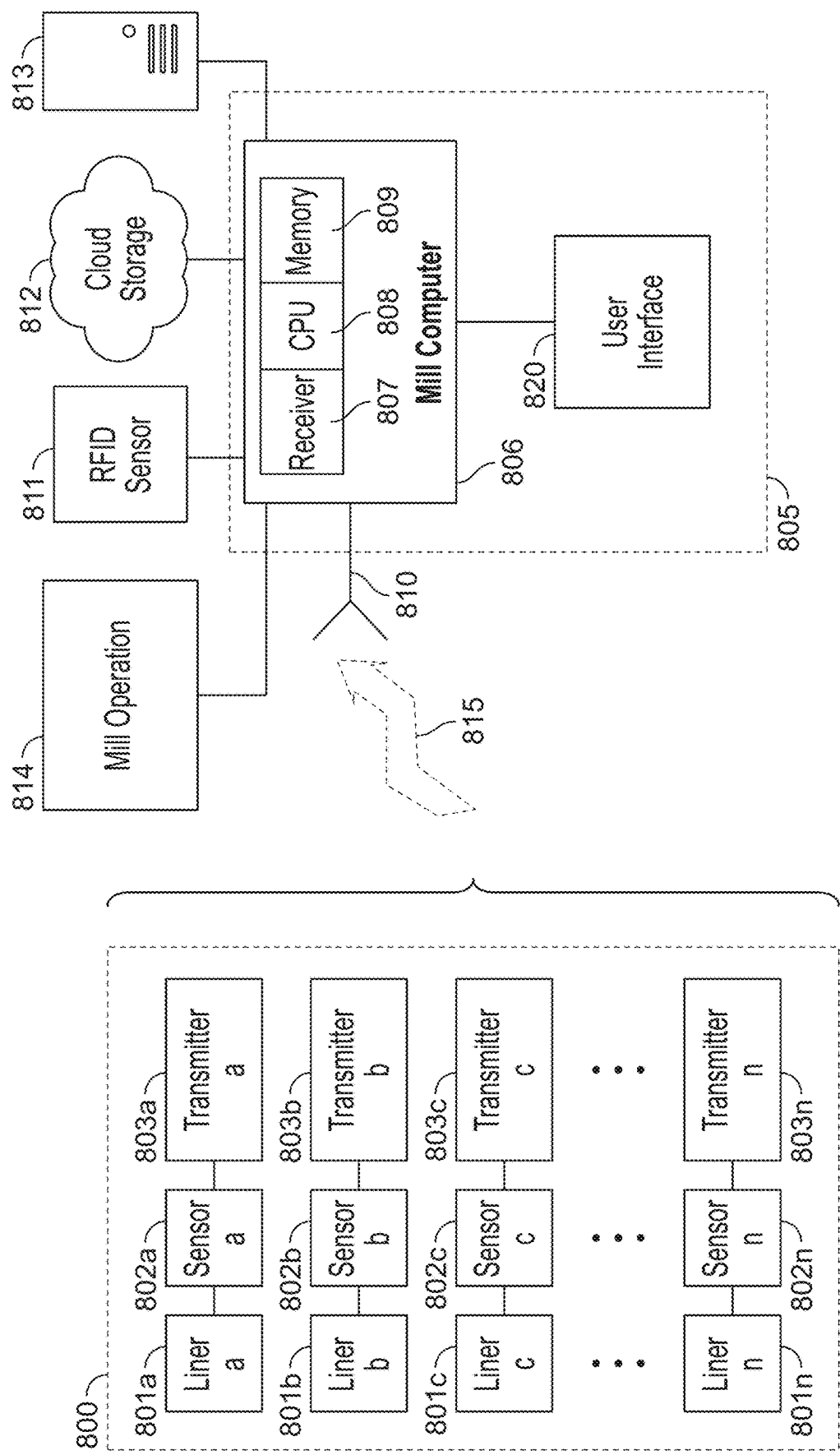
FIG. 8 is a schematic functional block diagram of the system utilized in connection with the various sensors installed in the liner assembly.

Turning now to FIG. 8 a functional block diagram is illustrated of an embodiment in accordance with the principles of the present invention. The shell of the mill is illustrated in dashed line at 800. Included in shell 800 is the mill cylindrical shell 12 and the mill conical heads at the feed end and the discharge end. The plurality of liner assemblies 801a, 801b, 801c . . . 801n may each be arranged and configured in accordance with the description of liner assembly 12 above. Further, each respective liner assembly 801a-801n preferably includes at least one corresponding sensor 802a, 802b, 802c . . . 802n and a corresponding transmitter 803a, 803b, 803c . . . 803n.

In one embodiment, each of the liner assemblies 801a-801n includes a plurality of sensors, including an RFID sensor, an inclinometer, an acoustic sensor, an inertial sensor and an ultrasonic sensor. However, it will be appreciated that the number of sensors in each liner assembly 801a-801n may vary. For example, in connection with the liner assemblies located on the mill conical heads, providing all of the sensors in each liner assembly may not be useful and/or required. Thus, the blocks 802a-802n generally include from at least at least one sensor up to several sensors.

Representative examples of sensors which may be used in connection include the following. The accelerometer (inertial sensor) is a 3-axis commercial device available under model number ADXL337 manufactured by Analog Devices of Norwood, Mass. The acoustic sensor is a sound impact sensor available under model number Parallax 29132 of Parallax, Inc. of Rocklin, Calif. One data transmitter which may be used as part of the DTU is available commercially under the model number designation Photon in Particle's Internet of Things, San Francisco, Calif. Ultrasonic sensors for use as non-destructive testing thickness gauges are available commercially from many different manufacturers (e.g., Cygnus Instruments of Jacksonville, Fla.).

A mill computer 806 is illustrated as including a receiver 807, processor or CPU 808, and memory 809. The computer may be a personal computer or a special purpose computer. A monitor and attendant user interface devices, such as input devices (i.e., a mouse and keyboard) are shown at block 820. The mill computer 806 and user interface 820 together comprise the mill performance evaluation block identified by 805. For example, the data received from the sensors 802a-802n may be compiled into a spreadsheet in real time so that a user may review the data at the mill performance block 805 and make adjustments to the operation of the mill and/or to determine that one or more liner assemblies 801a-801n have become thin or otherwise worn, and need to be replaced. A wear profile for the liner assemblies 801a-801n is preferably determined such that the user is able to identify from the data when a wear level is reached and replacement is desired for any individual liner 801a-801n. Further, the computer 806 is preferably connected to the mill operation block 814 so that a user may adjust the operating parameters of the mill (i.e., such as mill speed and ore feed rate, among others) based on the data received from the various sensors 802a-802n.

Antenna 810 receives the data from the plurality of transmitters 803a-803n. The antenna is connected to receiver 807. The plurality of over-the-air signals is identified by the arrow 815. To store the data, the computer 806 includes memory 809, as well as preferably being connected to cloud storage 812 and/or server 813.

Computer 806 is further connected to RFID sensor 811. The RFID sensor 811 may be used to determine the location of the specific liner assembly 801 by scanning an RFID tag on the liner assembly during the installation of the liner assembly within the mill 800. In this manner the location of the liner assembly and its corresponding sensors are in a known (or registered) location both within the mill 800 and in a position relative to the other liner assemblies 801a-801n.

Figure 9:
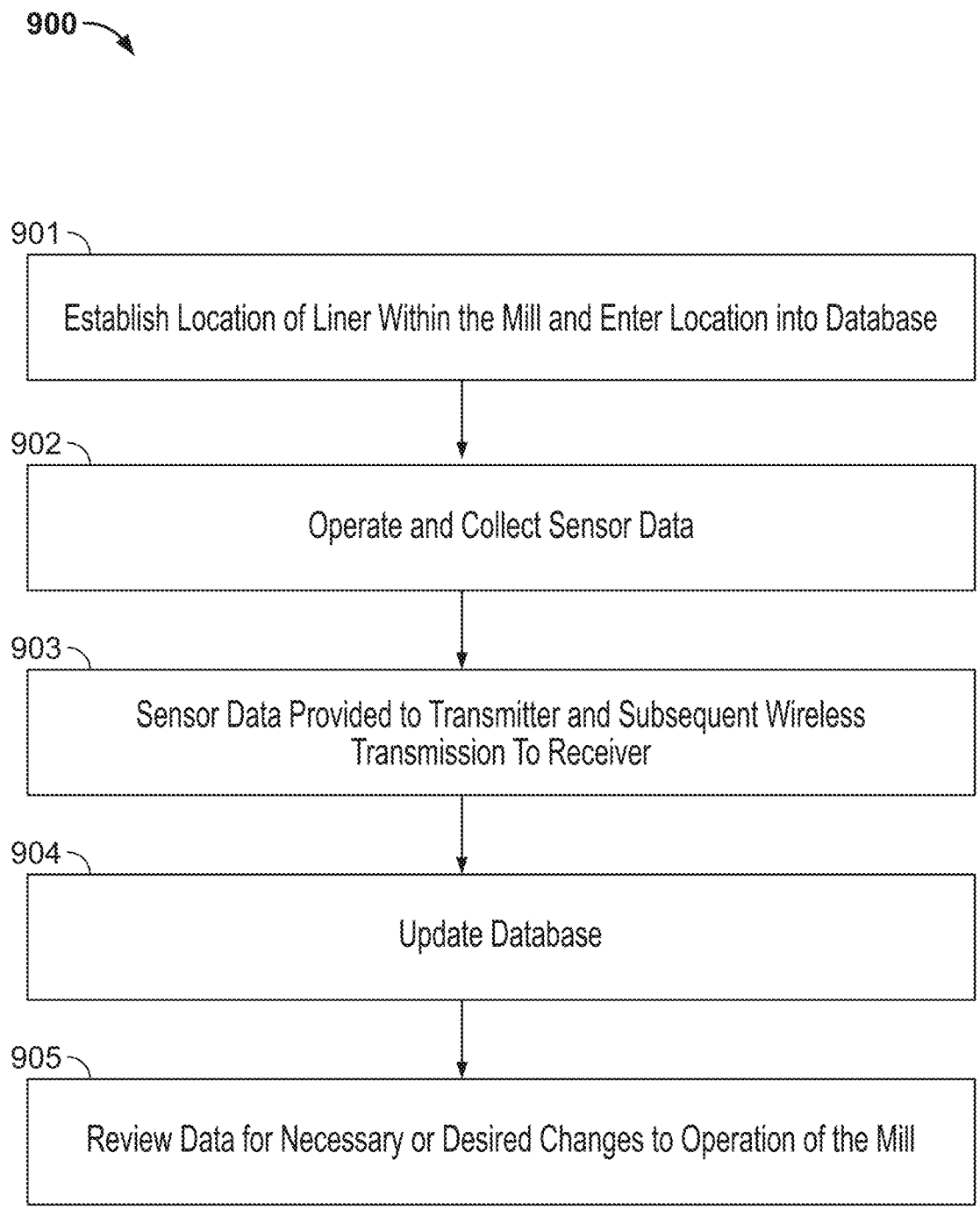
FIG. 9 is an illustration of the method steps which may be used to practice the principles of the present invention.

Next referring to FIG. 9, a flow chart illustrating the logical steps which may be taken in operation is disclosed generally at 900. At block 901, the liner assemblies 10 are installed within the mill. In the event that it is the initial installation of liner assemblies 10 in accordance with the principles of the invention, then each of the liner assemblies 10 will be installed and the specific position registered using an RFID sensor 811 and added to a database, spreadsheet, or other information presentation array (referred to for convenience as "database") in computer 806. Thus, the RFID tag aids in identifying from which liner assembly 10 the data provided by the plurality of sensors 802a-802n is coming. After initial installation, the comminution mill may be periodically stopped for replacement of liner assemblies 10 that have reached the predetermined wear in thickness or other predetermined wear profile. The replacement liner assemblies 10 also preferably include an RFID tag to aid in registering the location of the specific liner within the mill.

At block 902, the mill is operated and the sensors 802a-802n provide data to the respective DTU 30. At block 903, the DTUs 30 receive the data from the sensors 802a-802n. The data may be stored in a temporary fashion for batch transmission or may be transmitted in real-time. If batch transmission is utilized, those of skill in the art will recognize that a relatively shorter period of time between transmissions may be more useful for an operator or user to review the sensed data via the mill performance evaluation block 805. The data is transmitted from the DTUs 30 in a wireless fashion from transmitters 803a-803n to antenna 810. At block 904, the CPU 808 moves the data from receiver 807 and updates the database in memory 809. As data accumulates, the data may be stored in cloud storage 812 or on server 813. In addition, by moving the data to one or both of these areas, remote viewing of the data is enabled.

At block 905, the updated database is provided to the operator via user interface 820. Based on the data from the various sensors, the user may determine that a change in operation is desired or necessary. Further, the data may indicate the one or more liner assemblies 10 should be replaced—e.g., either because a wear profile has been reached and/or a sensor has stopped operating. Representative actions which may be taken by an operator reviewing the data are provided in the following Table 1.

TABLE 1

| SENSOR | USE | IF | THEN |
|---|---|---|---|
| RFID Sensor | RFID Tags are programmed with information | When liner is installed | Triggers log event Liner is entered into database |
| | | Liner is removed | Triggers log event Liner is updated in database Liner lifecycle is established |
| Inertial Sensor (Inclinometer and accelerometer) | Works with acoustic sensor Detects angular location | Large impacts are detected | A) Mill speed decreases B) Ore feed rate increases |
| Acoustic | Detect impact of grinding media | Large impacts are detected | A) Mill speed decreasesB) Ore feed rate increases |
| Ultrasonic Transducer | Monitor mill liner wear surface thickness | Liner(s) become worn and/or reach a predetermined wear profile | Liner(s) are changed to protect the mill shell |

As noted in the above Table 1, in the event that certain conditions arise, then an action may be taken to increase the efficiency of the operation of the mill. Further, the efficiency of keeping the mill in operation until required replacement of liner assemblies 10 is also maximized.

Figure 10:
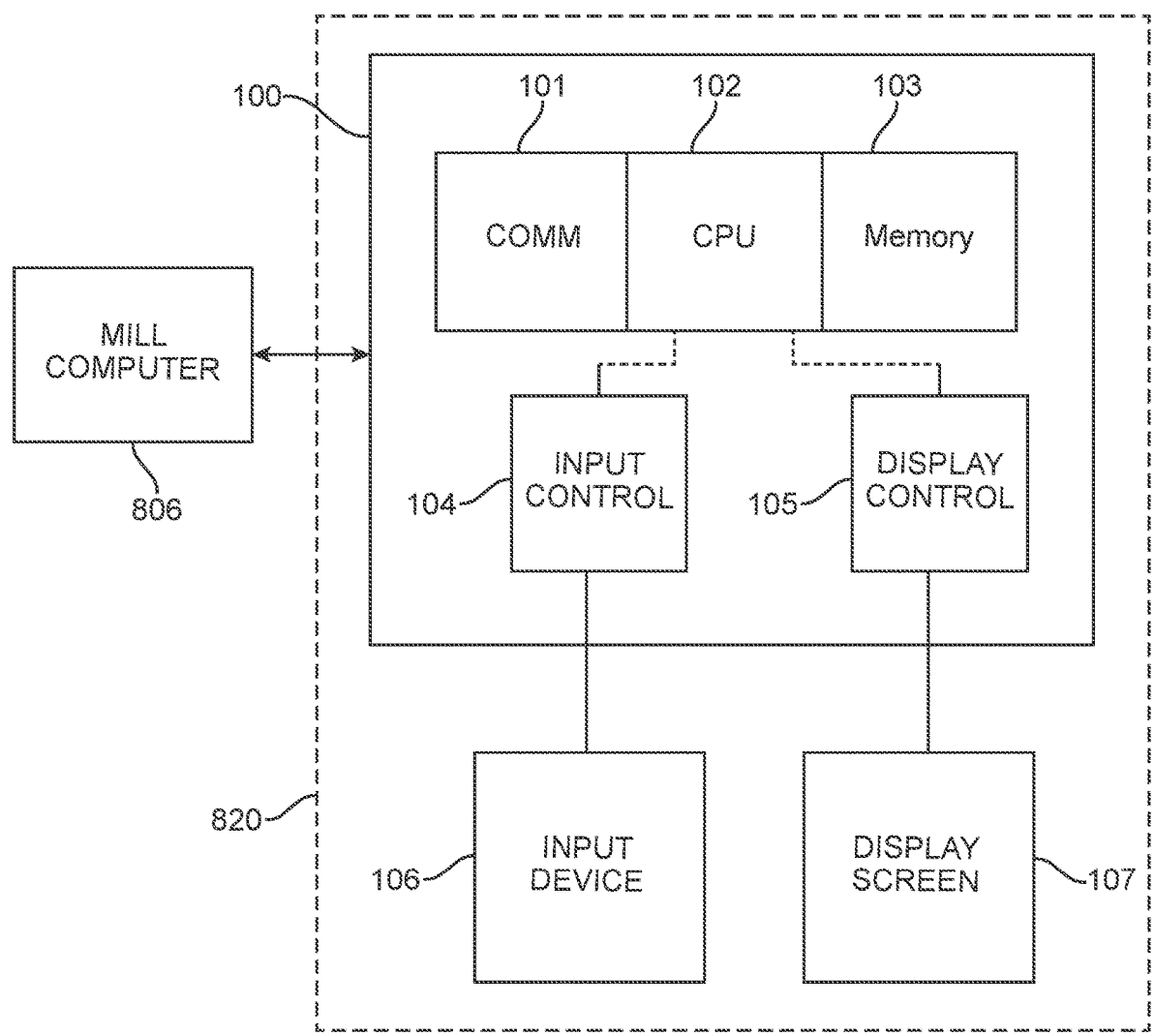
FIG. 10 is a schematic functional block of an embodiment of a user interface 820 which may be used in connection with the system.

Turning to FIG. 10 an embodiment of user interface 820 is illustrated in more detail. The user interface module 820 is connected to the mill computer 806 as previously described above. The user interface 820 may generally include a computing device 100, an input device 106 and a display screen 107. The computing device 100 includes a communications block 101 for communicating with the mill computer 806. The communications protocol utilized may take the form of a direct wired or wireless connection, intranet connection through a local server, wide area network, Bluetooth or other communication protocol. The communications block 101 is connected to a central processing unit ("CPU") 102. Also included in the computing device 100 are I/O devices, including an input controller 104 and a display controller 105. Additionally, a memory block 103 is connected to the CPU 102. The computing device 100 may be a personal computer, a special programmed computer, and/or a smart device (such as a phone or tablet). In addition, as will be appreciated by those skilled in the art, in some embodiments the operation of the user interface 820 may be included as a module or program that is executed by the mill computer 806.

The memory block 103 may include random access memory, nonvolatile memory, magnetic or optical disk storage, flash memory, or combinations thereof. In addition to storing data, memory block 103 may be configured to store a software program or module. By running the software program, the CPU 102 executes various functions or applications associated with operation of the mill 11 and provides a graphical user interface illustrating the data collected by the sensors 801, 802 and 803. For example, the following operations listed in TABLE 2 are representative of such applications:

TABLE 2

| USER OPERATIONS | Adjustment |
|---|---|
| SPEED | RPM |
| DIRECTION | Clockwise or Counterclockwise |
| BALL CHARGE | Feed Rate |

TABLE 2-continued

| USER OPERATIONS | Adjustment |
|---|---|
| ORE CHARGE | Feed Rate |
| WATER CHARGE | Feed Rate |
| MEDIA SIZE | Medium |

The input control 104 is part of the I/O subsystem of computing device 100. It handles the input signals from input device 106 and signal exchange with the CPU 102. The input device 106 may, for example, include a physical keyboard, a trackball, a mouse, or may be a touch sensitive surface (either separate or part of the display screen).

The display screen 107 may be configured to display information entered by a user or information provided/generated for the user. It may also provide a menu of user operations as described in Table 2 above and provide a dashboard of mill 10 operations (best seen in FIGS. 11a, 11b and 11c). The display screen 107 may include a display panel for visual display to the user, and may optionally include an associated touch panel. The display panel may take the form of various types of panels, such as an LCD, LED, OLED, and CRT, among others.

In operation, the communications block 101 receives input from the mill computer 806 on the operation of the mill 10 and from the plurality of sensors 801, 802, and 803. The information is provided to the CPU 102 which then provides a real-time, or near real-time, dashboard to the display screen 107 via display control 105. The dashboard enables a user to monitor the operation of the mill 10 and manipulate the interface to view different parameters and/or to change the operation of the mill 10. The information may also be stored in memory 103 (for example in a file for use in later statistical analysis, reference and/or studies). In addition, the CPU 102 waits for input from input device 106 from the user (via input control 104) on desired changes to the mill 10 operation or changes to the dashboard display. In the event of desired mill 10 operation changes, the CPU 102 provides the message to the communications block 101 for relaying to the mill computer 806.

Figure 11A:
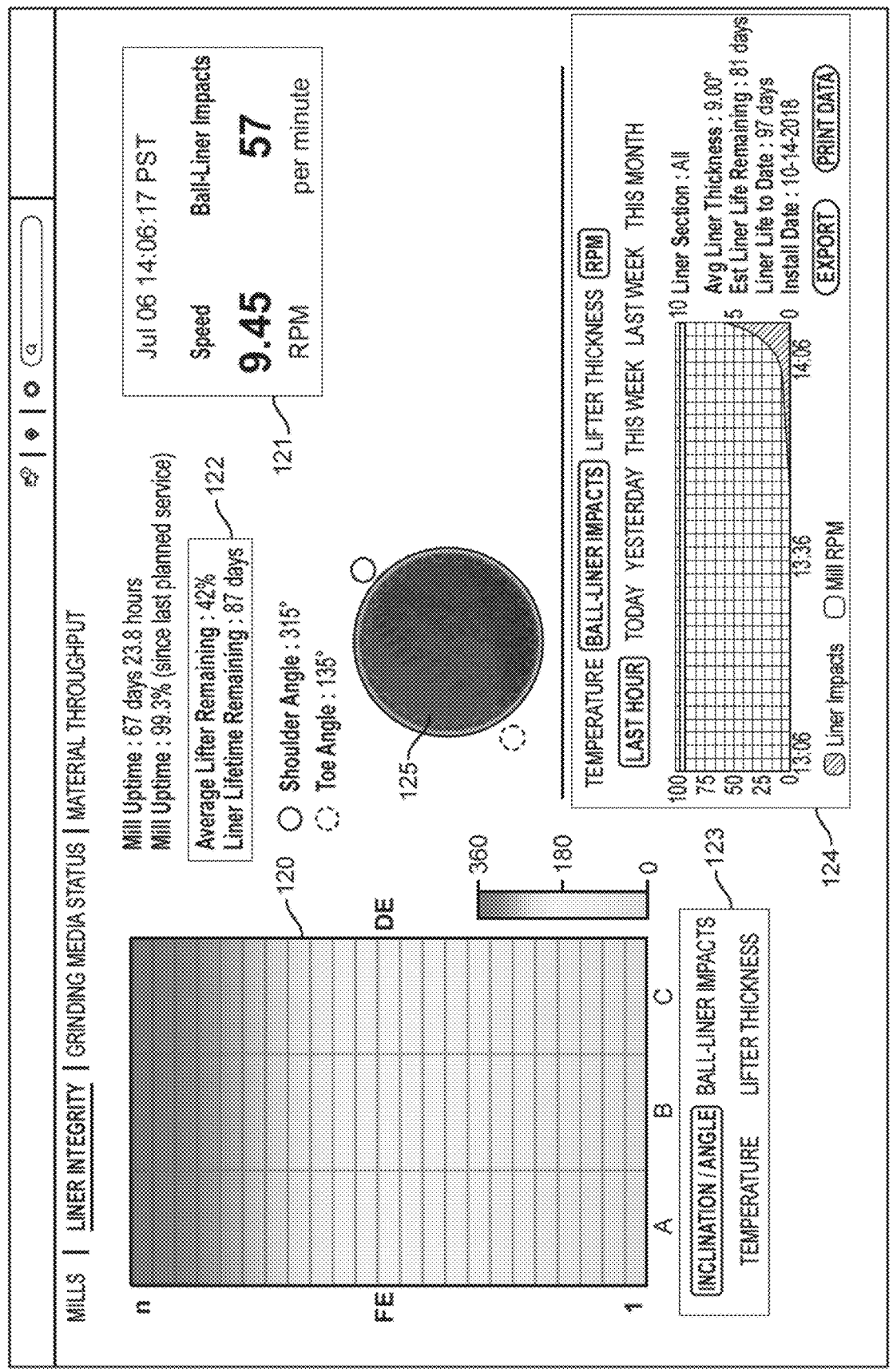
FIG. 11a illustrates an embodiment of a user interface to provide a user with information on the inclination/angle during operation of a mill in accordance with the system.
Figure 11B:
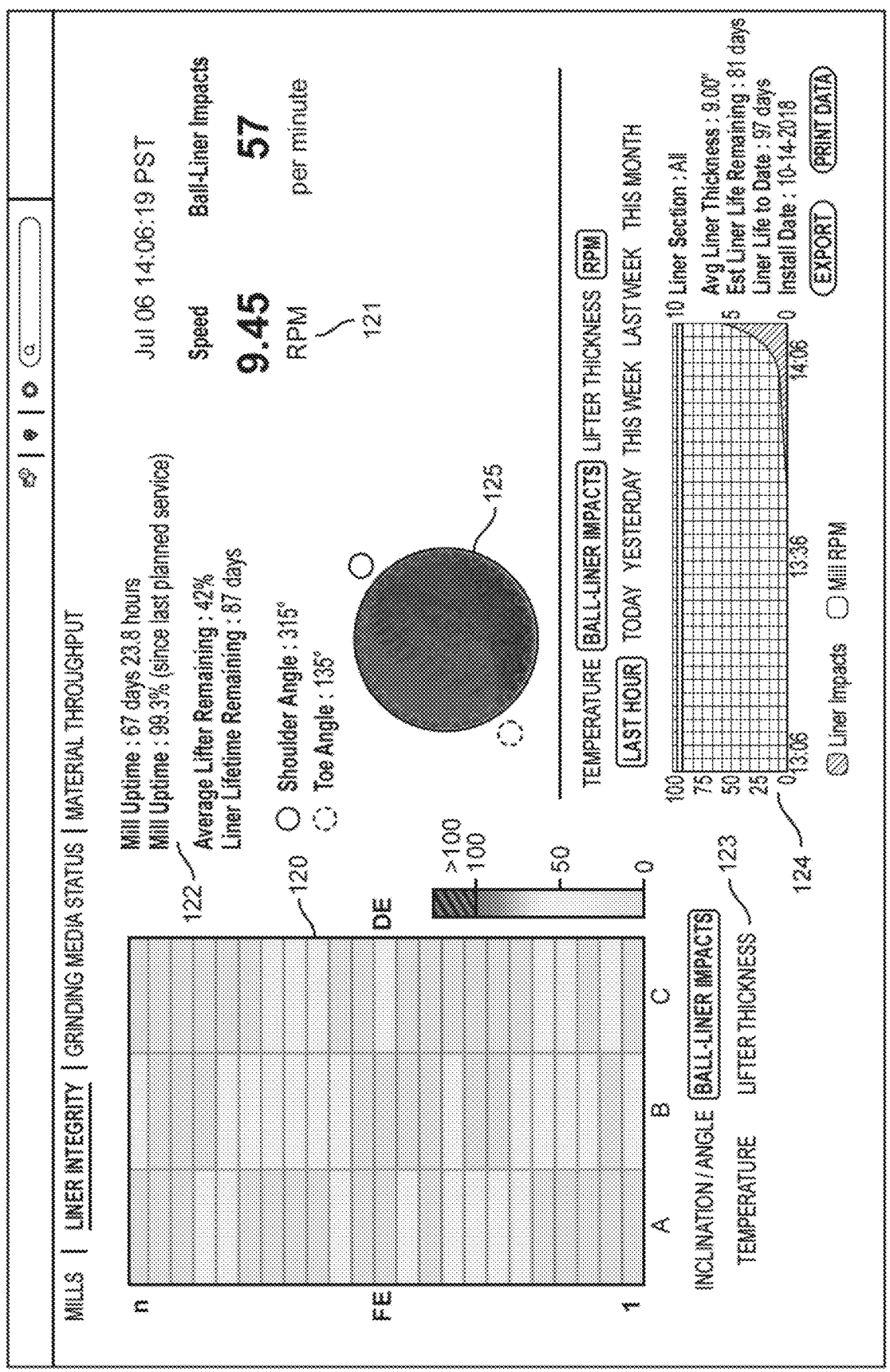
FIG. 11b illustrates an embodiment of a user interface to provide a user with information on the ball-liner impacts during operation of a mill at a first speed in accordance with the system.
Figure 11C:
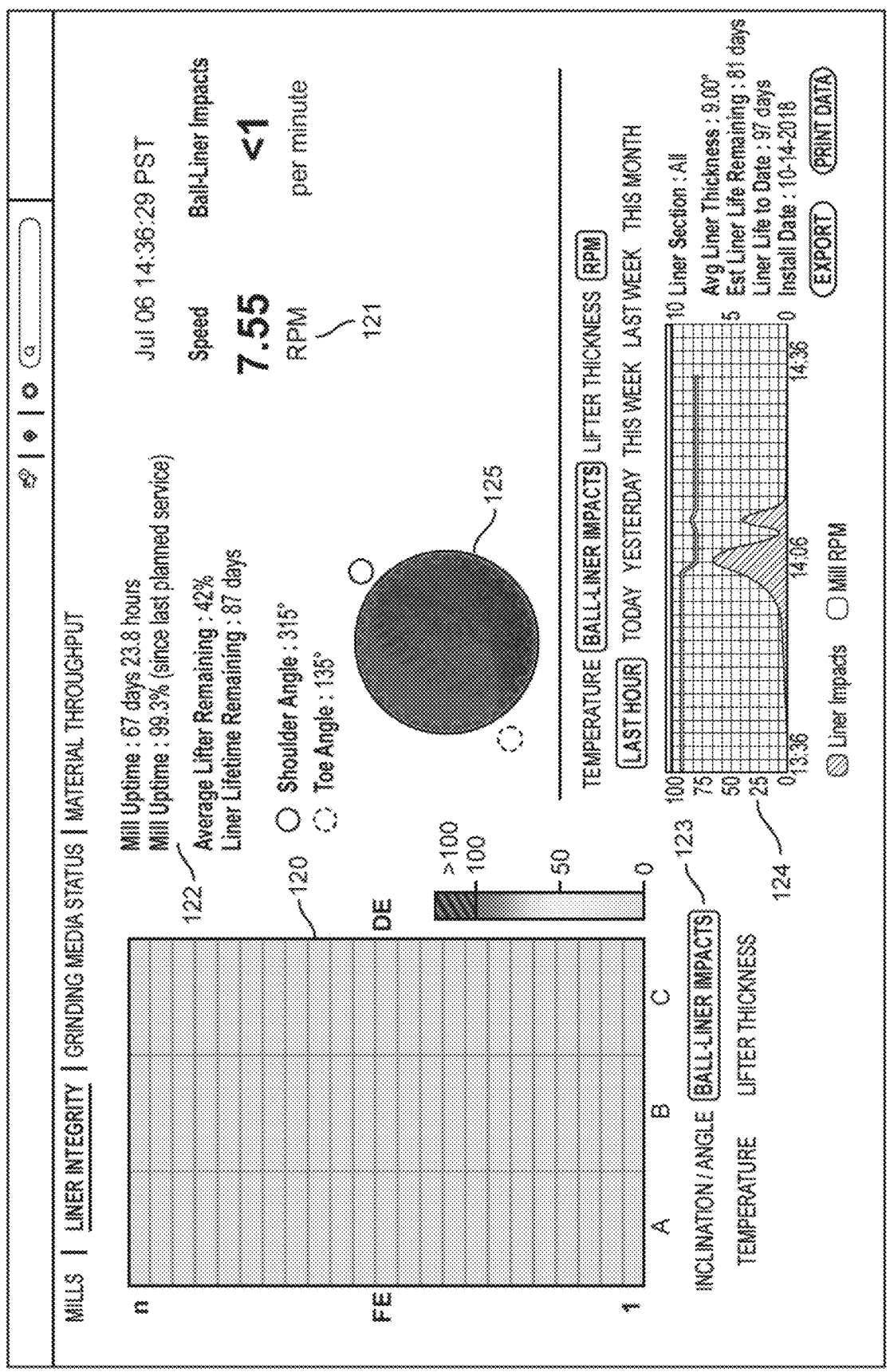
FIG. 11c illustrates an embodiment of a user interface to provide a user with information on the ball-impacts during operation of a mill at a second speed in accordance with the system.

Turning now to FIGS. 11a, 11b, and 11c, an embodiment of the dashboard of the user interface is provided. In FIGS. 11a, 11b and 11c several regions are indicated in the following TABLE 3.

TABLE 3

| NUMERICAL DESIGNATION | DESCRIPTION OF REGION |
|---|---|
| 120 | Provides graphical information from sensors located within the liner assemblies including inclination/angle, ball-liner impacts, temperature, and lifter thickness. Color in the region 120 is generated showing differences between the individual boxes (e.g., corresponding to individual liner assembly sensors). The colors in one embodiment varies from green to yellow to red (or lighter to darker shading) to indicate increasing intensity. |
| 121 | Provides graphical information on date and time, together with the mill 10 speed and ball-liner impacts per minute. |
| 122 | Provides information on the average lifter remaining and the anticipated liner lifetime remaining. |
| 123 | Provides user selection for the sensor data to be generated and illustrated in region 120 . . . namely inclination/angle, ball-liner impacts, temperature, and lifter thickness. |
| 124 | Provides a graphical indication of the liner impacts over time and the mill RPM. |

TABLE 3-continued

| NUMERICAL DESIGNATION | DESCRIPTION OF REGION |
|---|---|
| 125 | Provides a graphical indication of the location and movement of the charge and media within the mill as the mill rotates. |

By way of example, in FIG. 11a the region 120 is illustrating the inclination angle (shown as selected in region 123) relative to the liner impacts. The liners as represented in columns A, B, and C include a color generated by the CPU 102 based on the received sensor data 801-803. Accordingly, the region 120 acts to display a parameter of the mill 10 operation results in real-time or near-real time. The color generated for the display screen 107 in one embodiment moves from a green to yellow to red indicating an increasing frequency of the measured event. However, as shown in FIGS. 11a-11c, shading is illustrated from lighter to darker. It will be appreciated by those of skill in the art that other colors or markings might also be used. Region 121 illustrates the date, time, mill 10 speed and current ball-liner impacts. Based on the ball liner impacts over time (e.g., since the liners were last replaced), the CPU 102 estimates a lifetime remaining and provides the estimate in region 122. Further, region 124 illustrates the liner impacts over time—in this case extending from 13:06 to 14:06, or during the last minute. Accordingly, this section provides a recent history of a measured parameter versus the real-time graphical indication included in region 120. Region 125 provides a graphic representation media and charge inside the mill 10 as it rotates. By using the graphically generated information in regions 120, 124 and 125, a user can adjust the operations of the mill 10 in accordance with the controls in TABLE 2 and then view the results of the change.

FIG. 11b illustrates the same dashboard described in connection with FIG. 11a, but the ball-liner impacts are now selected for generation and illustration in region 120 (best seen in region 123). The speed and ball-liner impacts have been held constant as seen in regions 121, 122, 124 and 125. However, in FIG. 11c, the mill 10 speed has been slowed to 7.55 RPM (i.e., from the initial speed of 9.45 RPM). As can now be seen in region 121, the ball-liner impacts have dropped to less than 1 per minute and as shown in region 120 the frequency has changed from a moderate/yellow/mid-shading color to a more desired/green/lighter shading color. Further, the liner impacts illustrated in region 124 show that the peak impacts which occurred around 14:06, have now been successfully reduced at the time that the mill 10 was slowing to the lowered speed.

An embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

What is claimed is:

1. A system for generating a graphical user interface for monitoring a plurality of liner assemblies, of the type utilized as a wear item in the interior of a comminution mill from the media and charge, comprising:
   a) sensors located in each of the plurality of liner assemblies within the comminution mill, wherein a first sensor is arranged and configured to measure a change in the depth of each liner assembly and a second sensor is arranged and configured to measure the sounds of media and charge striking each liner assembly;
   b) a plurality of RFID tags having a unique identifier, wherein each liner assembly includes a discrete RFID tag, whereby the location of each liner assembly within the comminution mill is registered;
   c) a data transmission unit operatively connected to the first and second sensors and the RFID tags, wherein the first and second sensor data and associated RFID tag identifier is transmitted to a receiver;
   d) a processor connected to the receiver, wherein the processor compares the transmitted signals to predetermined wear reference values and generates a graphical display in a first region of the number of charge strikes per minute occurring in the comminution mill and an estimated time until replacement of one or more of the liner assemblies in a second region; and
   e) a display screen operatively connected to the processor on which the graphical information is displayed in the first and second regions.

2. The system of claim 1, wherein the first sensors are ultrasonic sensors.

3. The system of claim 1, wherein the processor generates date, time, mill speed and ball-liner impacts for generation in a third region of the display screen.

4. The system of claim 1, wherein the second sensors are acoustic sensors, wherein the acoustic sensors generate a signal indicative of the number of strikes on the respective liner assemblies from the charge and the media during operation of the comminution mill and wherein the processor determines the number of strikes occurring from the charge based on a predetermined characteristic parameter of the generated signal.

5. The system of claim 1, wherein the processor generates user selectable criteria to enable display of varying parameters associated with the liner assemblies in the first region.

6. The system of claim 5, wherein the selectable criteria is selected from the group consisting of inclination/angle, ball-liner impacts, temperature, and lifter thickness.

7. The system of claim 1, further including third sensors located within the liner assemblies, the third sensors including accelerometer sensors for generating signals indicative of the intensity of strikes on the respective liner assembly from the media and charge during operation of the comminution mill.

8. The system of claim 1, further including fourth sensors located within the liner assemblies, the fourth sensors including inertial sensors for generating signals indicative of the relative position of the respective liner assemblies within the comminution mill during operation of the comminution mill, and wherein the processor determines the location of the liner assemblies from the fourth generated signals and generates display data for display in a fifth region of the display screen illustrating the locations of the liner assemblies, charge and media based on the data from the first, second and fourth sensors and the RFID tag identifiers.

9. The system of claim 1, wherein the processor generates a timeline display for display in a sixth region showing liner impacts over time and the comminution mill RPM.

10. The system of claim 1, wherein the RFID tag registration occurs at installation of the liner assembly within the mill and the sensors are each located in a void in the liner assemblies and the data transmission unit is located at least partly within the comminution mill.

11. The system of claim 1, wherein the graphical information is displayed on the display screen in real-time or near real-time.

12. The system of claim 1, wherein the graphical display in the first region further comprises an inclination angle indicating a change in frequency of the charge strikes per minute.

13. A system for monitoring the operation of a comminution mill, comprising:
 a) a plurality of liner assemblies, the liner assemblies located within the comminution mill in a known position;
 b) a plurality of sensors to monitor a wear parameter of the liner assemblies, wherein:
  each liner assembly includes a first and second sensor, the first sensor generates a first signal indicative of a wear parameter of the corresponding liner assembly and a second sensor generates a second signal indicative of a ball-liner strike on the corresponding liner assembly, and each sensor is located inside of the comminution mill;
 c) a plurality of transmitters, the plurality of transmitters transmitting the first and second signals for comparison to predetermined wear reference values and to calculate an anticipated liner assembly lifetime remaining for each of the liner assemblies; and
 d) a display device on which the compared anticipated liner assembly lifetime remaining is visually displayed.

14. The system of claim 13, wherein the first sensors are ultrasonic sensors and the second sensors are acoustic sensors.

15. The system of claim 13, further comprising: a receiver for receiving the transmitted signals, a memory for storing predetermined wear reference values, and a processor for comparing the received first signals to the predetermined wear reference values and for calculating based on the current wear reference values and the number of ball-liner strikes the anticipated liner assembly lifetime remaining.

16. The system of claim 15, further comprising a plurality of RFID tags having a unique identifier, where the individual RFID tags are associated with corresponding liner assemblies, and where the RFID tag unique identifier is transmitted with the first and second signals, whereby the wear reference values are associated to corresponding liner assemblies.

17. The system of claim 16, wherein the processor generates graphical user data for display in a first and a second region the ball-liner strikes for each liner assembly and the remaining anticipated liner lifetime, respectively.

18. The system of claim 17, wherein the processed graphical user data for the first and second regions are provided by the processor to the display device and wherein operation of the mill may be reviewed based on the information displayed in the first and second regions of the display in real-time, whereby changes to the operation of the mill may be made in order to increase the efficiency of the mill operation or lengthen the anticipated liner lifetime.

19. A method for generating a graphical user interface for monitoring a plurality of liner assemblies, of the type utilized as a wear item in the interior of a comminution mill from the media and charge, comprising:
 a) locating sensors in each of the plurality of liner assemblies within the comminution mill, wherein a first sensor is arranged and configured to measure a change in the depth of each liner assembly and a second sensor is arranged and configured to measure the sounds of media and charge striking each liner assembly;
 b) registering a plurality of RFID tags having a unique identifier within the comminution mill, wherein each liner assembly includes a discrete RFID tag;
 c) transmitting the data from the first and second sensors and the RFID tags;
 d) receiving the data and using a processor to compare the transmitted data to predetermined wear reference values and generating a graphical display in a first region of the number of charge strikes per minute occurring in the comminution mill for each liner assembly and estimating an anticipated time for replacement of one or more of the liner assemblies for display in a second region; and
 e) displaying the information in the first and second regions on a display screen.

20. The method of claim 19, wherein the first sensors are ultrasonic sensors and the second sensors are acoustic sensors.

21. The method of claim 19, further including generating data for the date, time, mill speed and ball-liner impacts for display in a third region of the display screen.

22. The method of 21, further including locating fourth sensors within the liner assemblies, the fourth sensors including inertial sensors for generating signals indicative of the relative position of the respective liner assemblies within the comminution mill during operation of the comminution mill, and determining the location of the liner assemblies from the fourth generated signals and generating display data for display in a fifth region of the display screen illustrating the locations of the liner assemblies, charge and media based on the data from the first, second and fourth sensors and the RFID tag identifiers.

23. The method of claim 22, further comprising generating a timeline display for display in a sixth region showing liner impacts over time and the comminution mill RPM.

24. The method of claim 19, wherein the processor generates user selectable criteria to enable display of varying parameters associated with the liner assemblies in the first region.

25. The method of claim 24, wherein the selectable criteria is selected from the group consisting of inclination/angle, ball-liner impacts, temperature, and lifter thickness.

* * * * *